UNITED STATES PATENT OFFICE.

GEORGE W. CASILEAR, OF WASHINGTON, DISTRICT OF COLUMBIA.

HELIOGRAPHIC ENGRAVING.

SPECIFICATION forming part of Letters Patent No. 387,490, dated August 7, 1888.

Application filed September 17, 1887. Serial No. 250,003. (No specimens.)

*To all whom it may concern:*

Be it known that I, GEORGE W. CASILEAR, a citizen of the United States, residing at Washington, in the District of Columbia, have invented certain new and useful Improvements in the art known as "Heliographic Engraving," which I hereby designate as "Helioline Engraving;" and I do hereby declare that the following is a full, clear, and exact description of the invention, which will enable others skilled in the art to which it appertains to make and use the same.

Heretofore the methods applied by the agency of photography for producing photo-etchings on copper or steel plates have only been partially successful, with but little advancement over the earliest efforts made by Niepce, Talbot, and others, the general character of the work produced being shallow and smooth, lacking sufficient depth, tooth, and ink holding qualities, so essential for plate-printing, and so much so that skilled and prolonged labor is called into play to make them of any commercial value whatever for illustrated publications, even where a small edition is struck off, though aquatint granulations and other various devices for producing half-tones—as gauze opaque lines upon glass, &c.—have been resorted to to break up the continuity of the plate-surface. To overcome this difficulty, I prepare the polished plate with a thin layer of etching-ground or other similar varnish, or a film deposited by the battery, in order that its surface may be rendered impermeable to the action of acid; then with the ruling-machine I rule a course of fine lines across its face, crossing the same with a second or a third series of lines, if deemed advisable, or with dots made by a roulette. In this condition of the plate, the diamond-point having cut through the overlying film, exposed and slightly scratched the surface beneath, if it now be bitten, the etching-fluid would at once attack the bright excoriated lines with a clean sharp bite to any desired uniform depth. The small spaces between the intervening lines being protected by the impervious film, necessarily preserves its texture and purity of line. But instead of corroding the plate directly after the ruling, I take a thin gelatine sheet, sensitized with bichromate of potassa, on which, from a transparent positive, an image is made. This, after being developed by washing in water to remove the unaltered bichromate, is then squeezed in close contact with the plate; or, if preferable, I flow the plate with a solution of bichromated gelatine, asphaltum, or other sensitive fluid, adaptable to this process. In the latter instance, if the fluids are used, the film is dried and receives the visible or latent image in the usual way known to those who practice those methods. After the exposure, if the bichromated glues have been used, the etching may proceed at once. On the contrary, if a sensitive varnish be employed, a solvent for such varnish is used, according to the character of the agent employed, and the parts in their reciprocal relations being more or less insoluble, the soluble parts in their due proportion acted upon by the menstruum float off, and the resulting picture appears and unfolds itself.

In either condition, as described above, the plate is bitten, the acid penetrating through to the ruled lines in proportion to the action of the exposure. First the deeper shadows appear, and so on to the middle tones in their several gradations of texture, with the high lights well marked, till the whole picture is corroded into a finished engraving, faithfully represented in line, without the aid of etching-tool, stopping-out varnish, or the clever handling of the graver, thus producing a helioline engraved plate at once ready for the printing-press, capable of striking off thousands of impressions.

Should the work in any of its parts appear defective, the process can readily be repeated by ruling an additional series of lines and submitting the plate to a second exposure, or by rebiting, as practiced by the engraver.

Having fully described my invention, what I desire to claim and secure by Letters Patent is—

1. The method of producing a heliographic-printing plate, which consists in covering the plate with an acid resist, cutting a series of lines or dots through said resist, then attaching to this resist, as a substratum, a previously exposed and developed picture-bearing film, and finally etching the same, substantially as set forth.

2. The method of producing a heliographic-printing plate, which consists in covering the plate with an acid resist, cutting a series of lines or dots through said resist, flowing with a sensitive solution, and then, after drying, exposing under a positive and developing the same, submitting the plate to the action of the etching-acid, substantially as set forth.

GEORGE W. CASILEAR.

Witnesses:
GEO. W. KING,
JOHN J. BOGUE.